United States Patent [19]

Takagi et al.

[11] Patent Number: 5,251,329
[45] Date of Patent: Oct. 5, 1993

[54] RADIO TELEPHONE APPARATUS WITH MICROPHONE MOUNTED IN BATTERY CASE

[75] Inventors: Kotaro Takagi; Kunio Sato, both of Tokyo; Kazunori Imazaki, Kanagawa, all of Japan

[73] Assignee: Sony Corporation, Tokyo, Japan

[21] Appl. No.: 666,048

[22] Filed: Mar. 7, 1991

[30] Foreign Application Priority Data

| Mar. 7, 1990 | [JP] | Japan | 2-23012[U] |
| Oct. 26, 1990 | [JP] | Japan | 2-112538[U] |
| Nov. 2, 1990 | [JP] | Japan | 2-114698[U] |

[51] Int. Cl.$^5$ .............................................. H04B 1/38
[52] U.S. Cl. ..................................... 455/89; 455/90; 455/128; 455/348; 455/349; 379/440
[58] Field of Search ................ 455/89, 90, 128, 347, 455/348, 349, 350, 351; 429/97-100; 379/431, 433, 440; 14/137, 138

[56] References Cited

U.S. PATENT DOCUMENTS

| 4,578,628 | 3/1986 | Siwiak | 455/349 |
| 4,641,370 | 2/1987 | Oyamada | 455/90 |
| 4,845,772 | 7/1989 | Metroka | 455/90 |
| 5,109,539 | 4/1992 | Inubushi | 455/349 |

FOREIGN PATENT DOCUMENTS

| 0018940 | 11/1980 | European Pat. Off. . |
| 0315736 | 5/1989 | European Pat. Off. . |
| 3341328 | 5/1985 | Fed. Rep. of Germany . |
| 0160733 | 8/1985 | Japan | 455/89 |
| WO90/13952 | 11/1990 | PCT Int'l Appl. . |

OTHER PUBLICATIONS

Mitsubishi International Corporation brochure: "Model 3000 Portable Cellular Telephone" Jan. 1, 1991.

Primary Examiner—Reinhard J. Eisenzopf
Assistant Examiner—Philip J. Sobutka
Attorney, Agent, or Firm—Hill, Steadman & Simpson

[57] ABSTRACT

A radio telephone apparatus for transmitting and receiving information signals as electrical waves includes a main body section towards one end of which a speaker unit is enclosed. A battery casing accommodating a battery which is adapted for supplying power to the main body section is detachably mounted on the other end of the main body section to reduce the size and the thickness of the apparatus. A ringer device is enclosed within the battery casing so that the acoustic sound emitted by the ringer is prevented from reaching the user's ear which is in the vicinity of the speaker unit. The microphone for the radiotelephone apparatus in also enclosed within the battery casing.

7 Claims, 11 Drawing Sheets

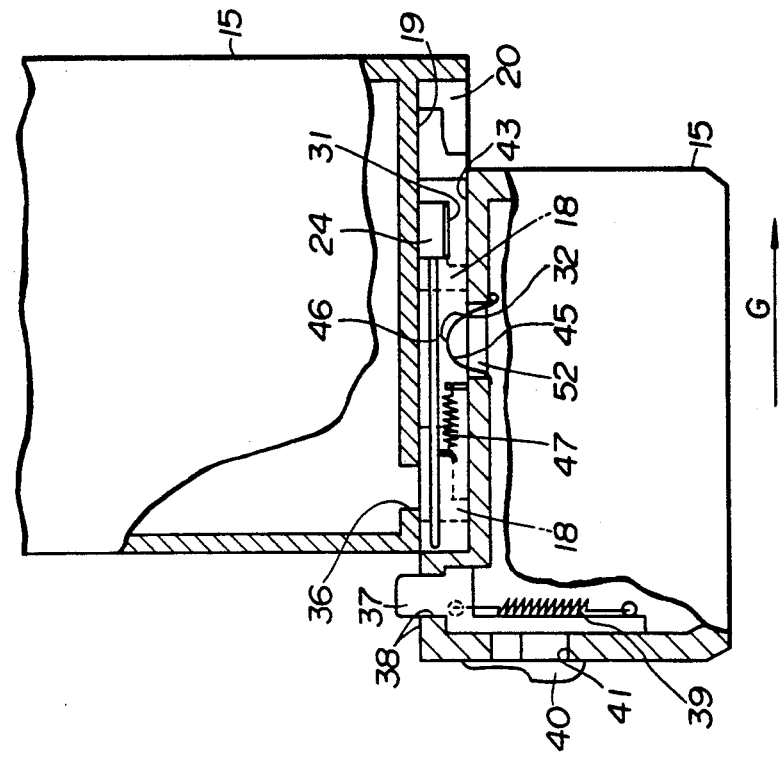
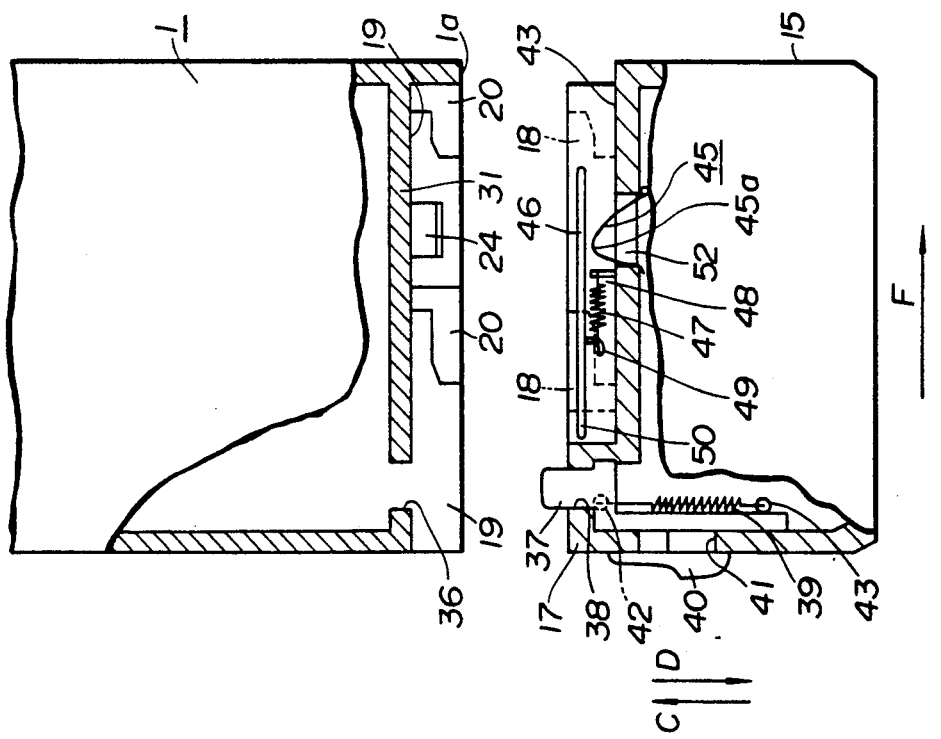
FIG. 8
FIG. 7

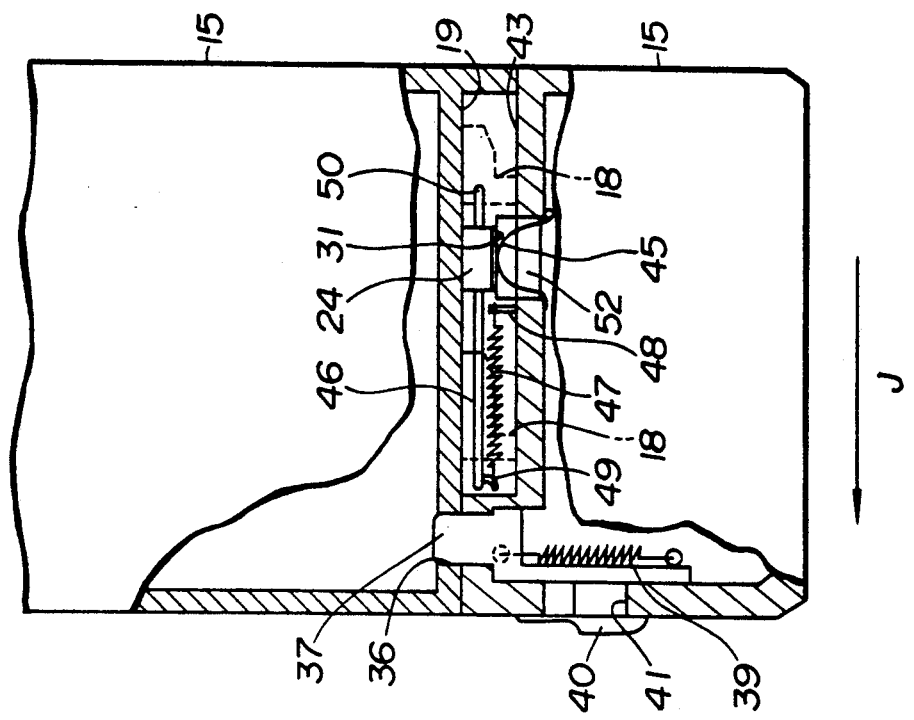
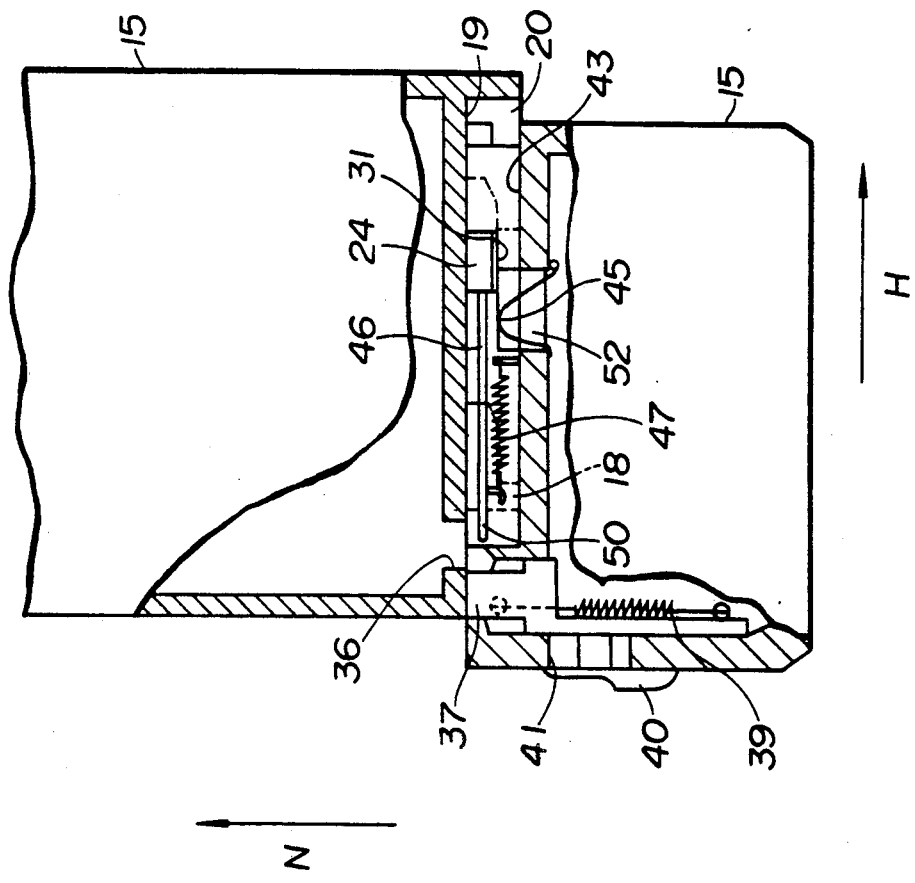

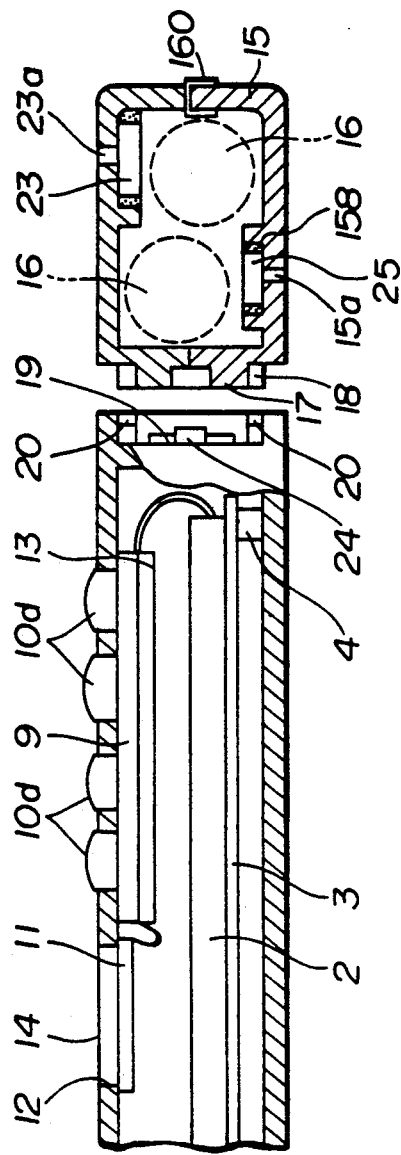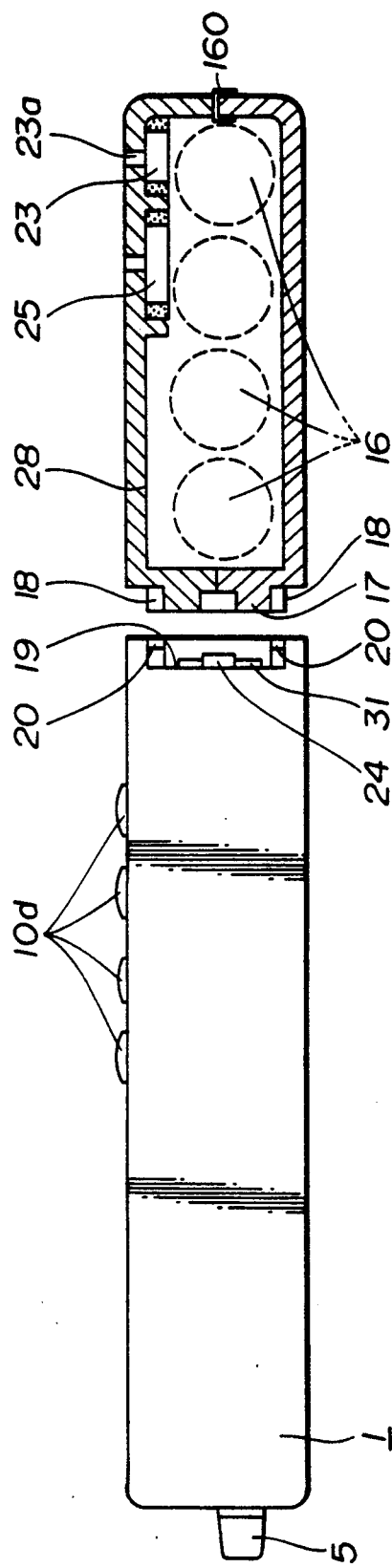
FIG.11
FIG.12

RADIO TELEPHONE APPARATUS WITH MICROPHONE MOUNTED IN BATTERY CASE

BACKGROUND OF THE INVENTION

1. Field of the Invention

This invention relates to a radio telephone apparatus for transmitting and receiving voice information signals as electrical waves. More particularly, it relates to a portable radio telephone apparatus having enclosed therein a power source for supplying a driving power to a receiver section provided with a speaker unit and to a transmitter section provided with a microphone unit.

2. Description of the Prior Art

Up to now, there is proposed a radio telephone apparatus adapted to transmit information signals entered as acoustic signals to a telephone exchange station as electrical waves and to receive the information signals transmitted as electrical waves from the telephone exchange station to output the received signals as acoustic signals.

Such a radio telephone apparatus includes a receiver section provided with a speaker unit for converting electrical waves into acoustic signals and a transmitter section provided with a microphone unit for converting the acoustic signals into electrical signals. The radio telephone apparatus also includes a transmitting section for transmitting the electrical signals sent from the transmitter section as electrical waves and a receiving section for receiving electrical waves and transmitting the received electrical waves to the receiver section as electrical signals. The receiver section, transmitter section, transmitting section and the receiving section are provided as electronic circuits each constructed or predetermined electronic components.

Such a radio telephone apparatus which is reduced in size so as to be portable is shown in FIG. 1 and formed of the receiver section, transmitter section, transmitting section and the receiving section, all of which are enclosed in a unitary casing 101. This casing 101 has the speaker unit 102 and the microphone unit 103 enclosed within upper and lower end portions in the drawing, respectively. The casing 101 is bent slightly in contour so as to lie along the user's face with the speaker unit 102 facing to the user's auricle and with the microphone unit-103 facing to the user's mouth.

The radio telephone apparatus is also provided with a power source casing 105 containing a power source device 104, such as a dry cell or a chargeable battery, for supplying the driving power to the receiver section, transmitter section, transmitting section and to receiving section. This power source casing 105 is removably attached to the back side of the casing 101 opposite to the side thereof confronting to the face of the user of the radio telephone apparatus.

A ringer device 106 is provided within the casing 101. The ringer device 106 is constructed for issuing an acoustic sound for giving notice that the electrical waves sent from the telephone exchange station have been received by the receiver section or confirming the user's operation on the transmitter section. This acoustic sound may, for example, be of a constant unitary frequency and interrupted at a predetermined interval on the order of a few seconds.

With the above described radio telephone apparatus, the total usable time by a given power source device is determined by the storage capacity of the power source device. Thus, with the above described radio telephone apparatus, if the time during which the apparatus may be used by one charging operation of a sole power device is set to be longer, the power source device is bulky and can hardly be reduced in size.

If a small-sized power source device with a small storage capacity is used for reducing the size of the radio telephone apparatus, the usable time of the apparatus is shortened and hence the apparatus may become unusuable while it is in use. That is, if the power supply becomes low during usage, transmission and reception of the electrical waves become unfeasible and hence the talk over the telephone may be terminated.

On the other hand, since the ringer device 106 is provided in the casing 101, the acoustic sound produced by the ringer device 106 is propagated through the casing 101 so as to be allowed out by way of a through-hole by which the speaker unit 102 faces the outside of the outer casing 101. The ringer device is adapted to emit an acoustic sound of a sound pressure which may be felt by the user at a distance of, for example, one to two meters from the radio telephone apparatus.

Thus, when the ringer device is actuated while the radio telephone apparatus is in use with the speaker unit 102 lying in close proximity to the user's auricle, there is the risk that the sound emitted by the ringer device will reach the user's auditory meatus with an excessive sound pressure. If the acoustic sound with an excessive sound pressure reaches the user's auditory meatus, not only may the user feel uncomfortable, but the user's tympanic membrane may be damaged.

OBJECT AND SUMMARY OF THE INVENTION

It is a principal object of the present invention to provide a radio telephone apparatus which may be used continually for a prolonged time through a sufficient electrical storage capacity and which may be diminished in size.

It is another object of the present invention to provide a radio telephone apparatus in which the acoustic sound emitted by the ringer device during use of the apparatus is prevented from reaching the user's auditory meatus so as to enable the telephone apparatus to be used with no uncomfortable feeling imparted by the ringer.

It is another object of the present invention to provide a radio telephone apparatus in which the distance between the speaker unit and the microphone is matched to the distance between the user's ears and mouth to enable voice transmission and reception with optimum acoustic characteristics and which may be reduced in size when not in use.

It is a further object of the present invention to provide a radio telephone apparatus in which electrical contacts may be protected by a battery container removably mounted on a receiver section accommodating the speaker unit.

The radio telephone apparatus according to the present invention includes a receiver section provided with a speaker unit and a transmitter section provided with a microphone unit. The radio telephone device comprises a first casing accommodating a speaker unit, a second casing accommodating a power source device supplying the driving power to the receiver section and the transmitter section, said second casing having on one side thereof an attachment-detachment section for said first casing, and a microphone unit mounted on the side of said second casing opposite to said side of said attachment-detachment section.

In one aspect of the present invention, the radio telephone apparatus is so constructed that a microphone container containing the microphone unit is mounted on the opposite side of the second casing so as to be opened and closed so that said microphone unit may be operated in both the closed and opened states of the microphone container.

In another aspect of the present invention, the radio telephone apparatus is provided with a ringer device in the battery container.

The above and other objects, features and advantages of the present invention will become more apparent from the following description especially when read in conjunction with the accompanying drawings.

BRIEF DESCRIPTION OF THE DRAWINGS

FIG. 7 is a front view showing the radio telephone apparatus with a portion thereof being broken away.

FIG. 8 is a front view showing the state of initiation of the connection between the battery casing and the outer casing of the radio telephone apparatus, with a portion being broken away.

FIG. 9 is a front view similar to FIG. 8 and showing the process of connection of the battery casing and the outer casing of the radio telephone apparatus, with a portion being broken away.

FIG. 10 is a front view similar to FIGS. 8 and 9 showing the state of completion of connection between the battery casing and the outer casing, with a portion being broken away.

FIG. 11 is a sectional view showing the battery casing and showing an illustrative mounting example of a ringer device with the ringer device on the opposite side of the battery casing.

FIG. 12 is a longitudinal sectional view showing a large sized battery casing.

DESCRIPTION OF THE PREFERRED EMBODIMENTS

A radio telephone apparatus according to the present invention is adapted for transmitting information signals, input thereto as acoustic signals, to a telephone exchange station via electric waves, and for receiving information signals transmitted thereto from the telephone exchange station as electrical waves, and outputting the received signals as voice.

Figure 1:
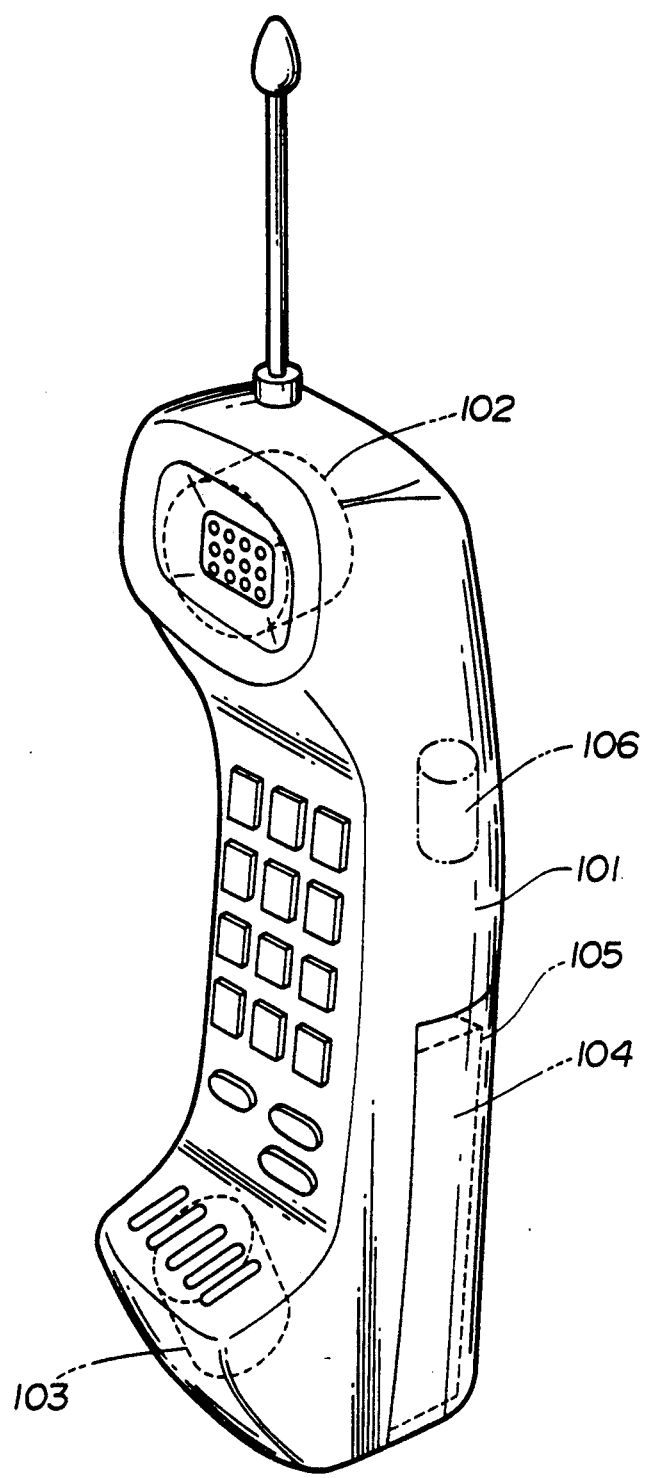
FIG. 1 is a perspective view showing a conventional radio telephone apparatus.
Figure 2:
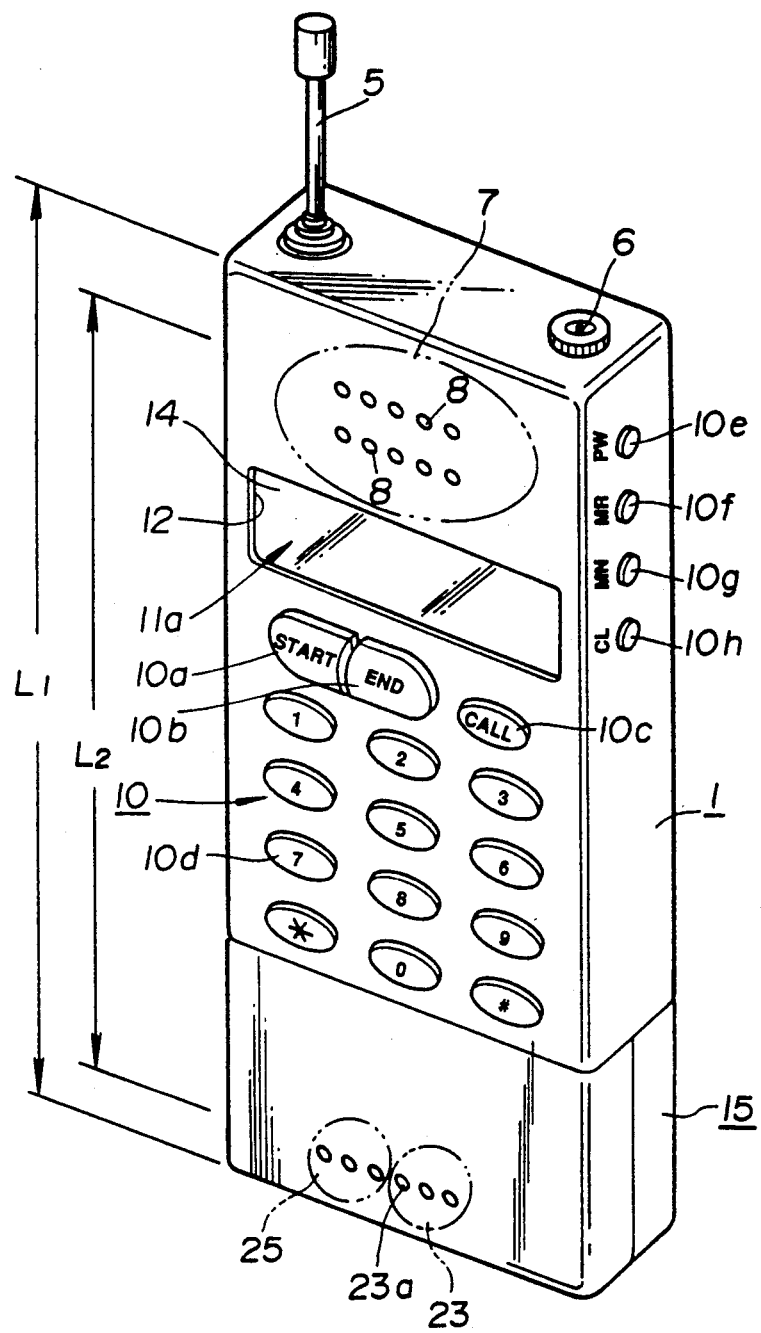
FIG. 2 is a perspective view showing a radio telephone apparatus according to the present invention.
Figure 3:
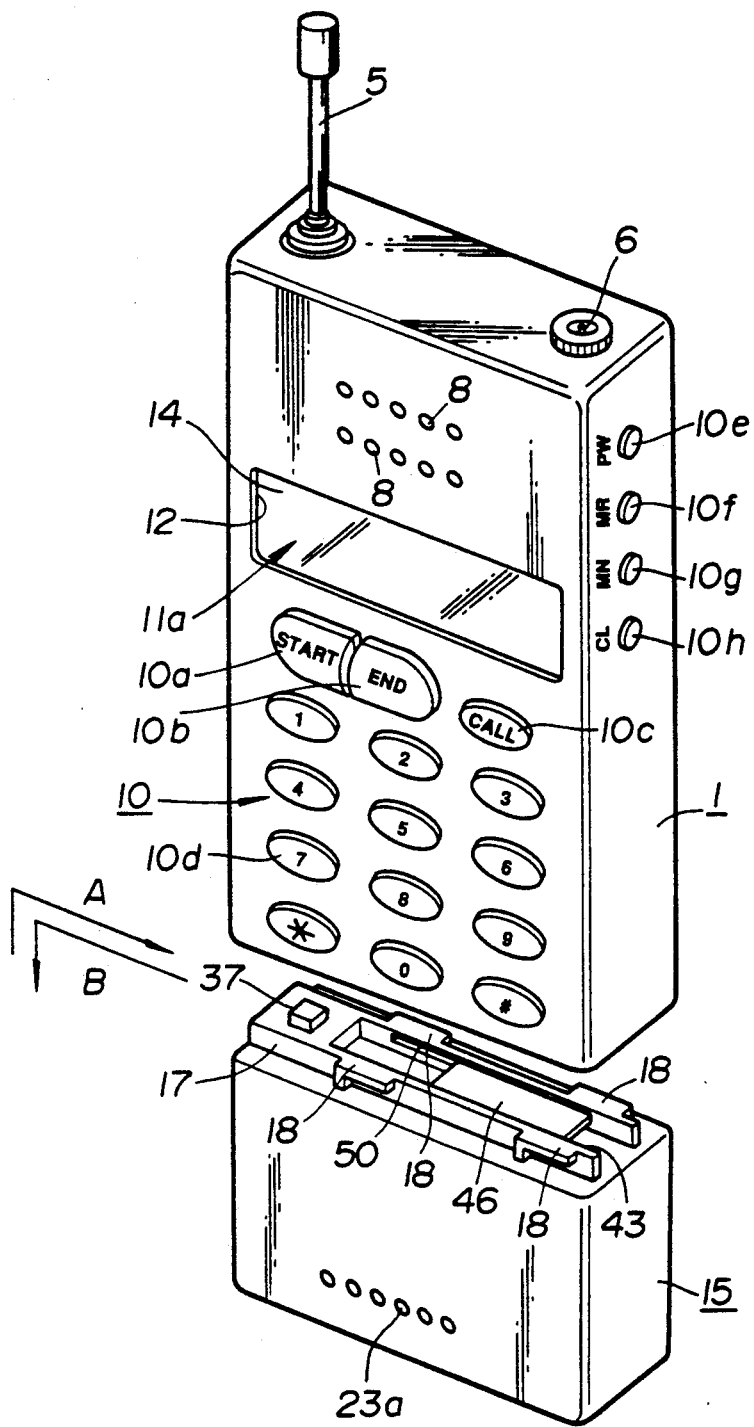
FIG. 3 is a perspective view of the radio telephone apparatus similar to FIG. 2, with a battery container detached from the outer casing.
Figure 4:
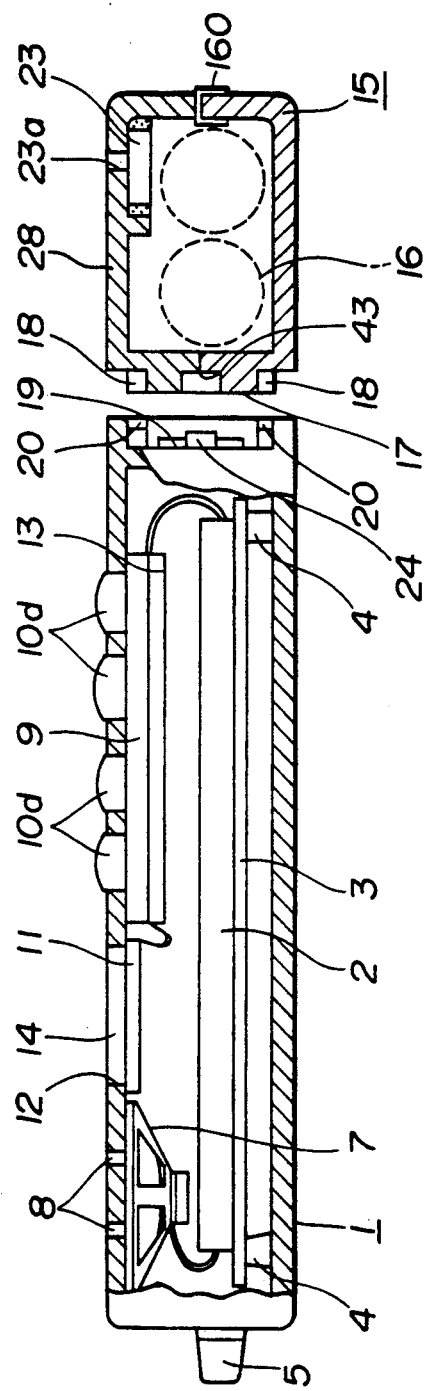
FIG. 4 is a longitudinal sectional view showing the radio telephone apparatus with the battery container detached from the outer casing.
Figure 5:
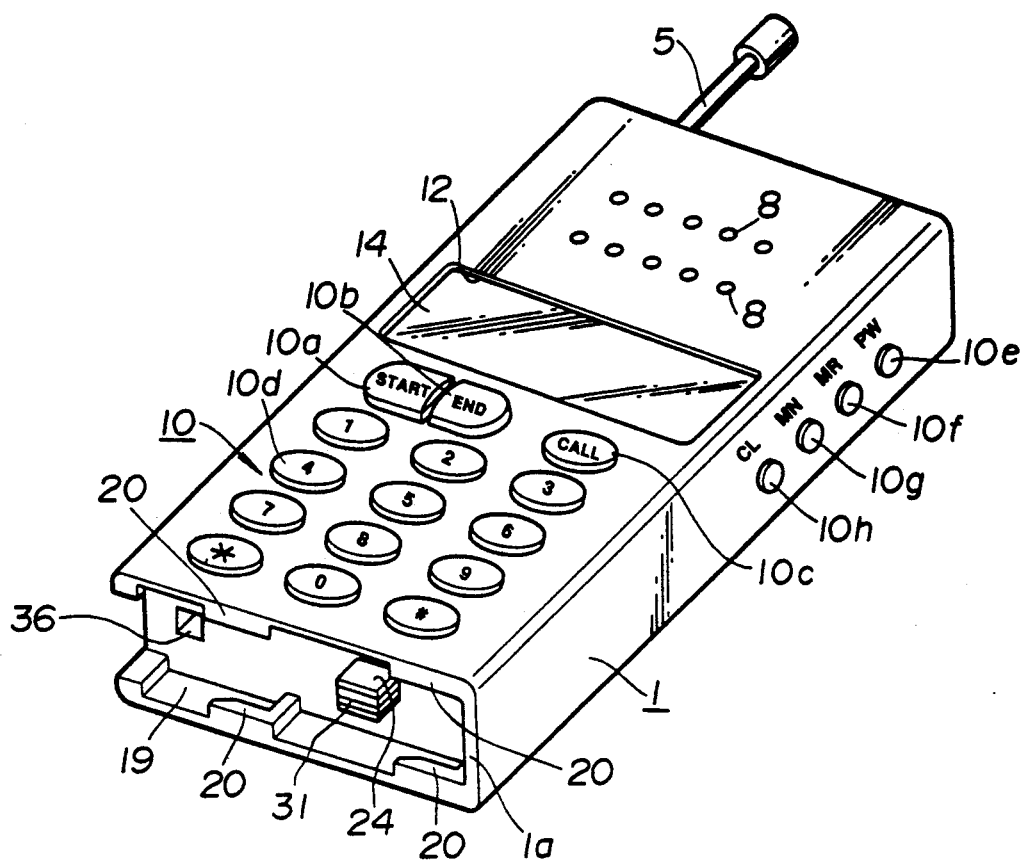
FIG. 5 is a perspective view showing the outer casing constituting the radio telephone apparatus as viewed from the bottom side thereof.

Referring to FIGS. 2, 3 and 4, the radio telephone apparatus includes an outer casing 1 as a first casing, forming an outer wall of a main body section accommodating a speaker unit 7 for outputting the reproduced sound, and a battery casing 15 as a second casing, detachably mounted on the outer casing 1 and accommodating a battery 16 as a power source for the main body section and a microphone unit 23 for voice detection.

The outer casing 1 is formed of synthetic resin on the like material as a substantially rectangular casing. A circuit board 3 is provided within the outer casing 1, as shown in FIG. 4. A set of electronic components 2, forming an electronic circuit, are attached to the circuit board 3, for forming, in cooperation with the circuit board 3, a transceiver circuit for receiving the electrical waves transmitted from the telephone exchange station and converting them into electrical signals, and for transmitting electrical waves to the telephone exchange station. The circuit board 3 is supported within the outer casing 1 by plural supporting bosses 4 integral with and projecting from the inner surfaces of the outer casing 1.

The outer casing 1 is also provided with an antenna 5 and an external antenna connection terminal 6 for the transceiver circuit section to send or receive the electrical waves. The antenna 5 and the external antenna connection terminal 6 are connected to the transceiver circuit section.

The speaker unit 7 supplied with the received signals from the transceiver circuit section and adapted for converting the received signals into voice is provided within the outer casing 1. The speaker unit 7 is provided on one end of the outer casing 1 and supported with the sound radiating side facing the front side of the outer casing 1. The front side of the outer casing 1 facing the sound radiating side of the speaker unit 7 is formed with a plurality of sound radiating apertures 8. That is, the voice emitted from the speaker unit 7 is propagated via apertures 8 towards the outer side of the outer casing 1.

An input device 9 is enclosed within the outer casing 1. This input device 9 is provided with a plurality of pushbuttons 10, such as dial keys, for inputting the information, and an electronic circuit, and is adapted for generating information signals associated with the input information and supplying the generated information to the transceiver circuit section. The information signals generated in the input device 9 are used for identifying the destination of the transmitted electrical waves. The input device 9 is provided within and towards the front side of the outer casing 1 and has the pushbuttons 10 protruded towards the outside by way of through-holes formed in the front and lateral sides of the outer casing 1 in association with the pushbuttons 10. Among these pushbuttons 10 are a start button (START) 10a for instructing the start of transmission and reception, an end button (END) 10b for instructing the end of transmission and reception, a call button (CALL) button 10c for reading out from a memory in the transceiver circuit section a so-called compacted dial adapted for indicating the destination of the transmitted waves with a shortened number, and a ten-key button 10d for inputting the number indicating the destination of the transmitted waves. A power source button (PW) 10e for instructing the power turn-on to the radio telephone apparatus, a memory, button MR 10f for storing the compacted dial in the memory, a menu button (MN) 10g for practicing various functions of the radio telephone apparatus in cooperation with the pushbuttons 10, and a clear button (CL) 10h for erasing the contents of the memory 10 and a display device 11 as later described, are also provided as the pushbutton 10.

The pushbutton 10 is formed of a translucent material so that letters or the like on the surface of the buttons may be illuminated by an illuminator 13 provided on the back side of the input device 9.

The display device 11 is enclosed within the other casing 1. The display device 11 has a display surface 11a, formed by, for example, a liquid crystal display or a CRT display, and adapted to be supplied with information signals generated in the input device 9 and various information signals contained in the received signals to make a display on the basis of these information signals. The display surface 11a of the display device 11 is exposed to the outside by means of a window 12 provided at the mid position on the front side of the outer casing 1. A closure plate 14 formed of a transparent material is fitted in the window 12.

Figure 6:
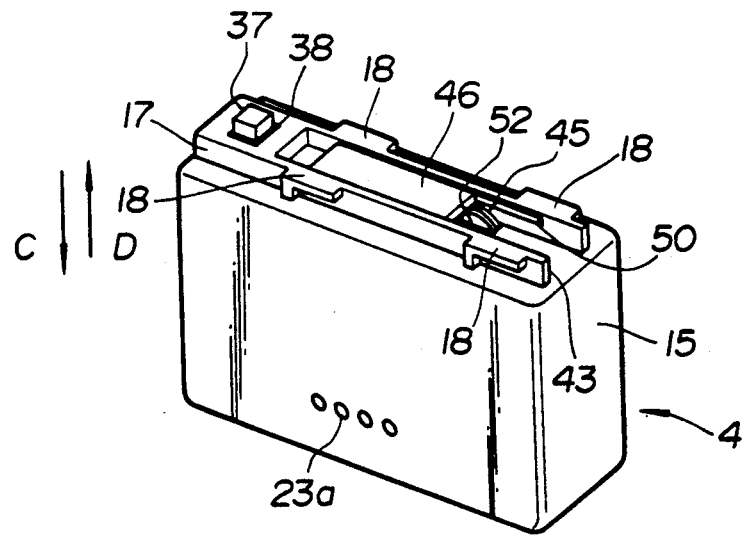
FIG. 6 is a perspective view showing a battery casing of the radio telephone apparatus with a cover member of the battery casing having been shifted.

The battery casing 15 as the second outer casing is detachably mounted on the other end of the outer casing 1. The battery casing 15 is rectangular as shown in FIG. 6 and a battery 16, such as a chargeable battery or a dry cell, for supplying the driving current to each part of the radio telephone apparatus, is accommodated in the casing 15. The other end of the outer casing 1, to which the battery casing 15 is attached, is formed with a groove 19 for detachably mounting the battery casing 15, as shown in FIGS. 4 and 6. This groove 19 has its one side opened towards one side of the outer casing 1 to permit the insertion of an engaging projection 17 provided on the battery casing 15, while having its other side closed by a wall member 1a on the other side of the outer casing 1. Mating engaging lugs 20, 20 are formed on both side wall sections of the groove 19 which prove to be front and rear sides of the outer casing 1.

A stationary contact 24, as an abutting section, is also provided within the groove 19. This stationary contact 24 is substantially rectangular and projectingly formed on the bottom surface of the groove 19. A plurality of connection terminals 31, including power source terminals, electrically connected to an electronic circuit provided within the outer casing 1, are adapted for facing the stationary contact 24. These connection terminals 31 are extended and positioned so as to be engaged in plural grooves formed on the end face of the stationary contact 24 to prevent shorting between adjoining terminals 31 as well as to assure positive connection with spring contacts which will be explained subsequently in detail.

The engaging projection 17 for engaging with the groove 19 formed on the end face of the outer casing 1 is provided on the battery casing 15 attached to the outer casing 1, as shown in FIGS. 3, 6 and 7. The projection 17 is formed on the attachment surface of the battery casing 15 to the outer casing 1 for extending from one to the other side of the battery casing 15. Both side edges of the projection 17 corresponding to the front and back sides of the battery casing 15 are formed with a pair of engaging lugs 18, 18 in association with the mating engaging lugs 20, 20.

The battery casing 15 is provided with a locking pin 37 adapted for engaging in an engaging opening 36 of the outer casing 1 when mounting the battery casing 15 on the outer casing 1 for positively holding the mounting state. As shown in FIGS. 6 and 7, the locking pin 37 is provided for projecting above the projection 17 by way of a locking pin protruding opening 38 formed on one side of the projection 17. This locking pin 37 is supported for reciprocation as shown by arrows C and D in FIGS. 6 and 7 so that its distal end may be advanced out of or receded into the locking pin protruding opening 38. The locking pin 37 is perpetually biased by a spring 39 so that the distal end of the pin is protruded out of the locking pin protruding opening 38 as shown by arrow D in FIGS. 6 and 7. The spring 39 has its one end retained by a retainer 42 of the locking pin 37 and has its other end retained by a retainer 43 provided within the battery casing 15.

An unlocking lever 40 is attached to the locking pin 37. The unlocking lever 40 is projected outwardly by way of an unlocking lever inserting opening 41 formed on one side wall section of the battery casing 15. The unlocking lever 40 may be moved as with the operator's finger for shifting the locking pin 37 against the force of the spring 39 as shown by arrow D in FIG. 7.

A contact groove 43 is provided in the projection 17 of the battery casing 15, as shown in FIG. 6, for extending along the length of the projection 17. A plurality of spring connection terminals 45, electrically connected to the stationary contact 24 of the outer casing 1, are provided within the contact groove 43. Among the spring connection terminals 45 forming the spring contact sections are a power supply terminal and terminals for transmitting and receiving signals to and from the microphone unit 23. Each of the spring connection terminals 45 has a bent resilient deflectible section 45a which is projected from a recess 52 formed in the contact groove 43 and which may be pressed so as to emerge from or be receded into the recess 52.

A cover member 46 is provided in the contact groove 43 for overlying the spring connection terminal 45. This cover member 46 is in the form of a flat plate having both its edges engaged in a pair of over member supporting grooves 50, 50 formed in opposite wall sections within the contact groove 43 directed towards the front and back sides of the battery casing 15. The cover member 46 may be slid along the cover member supporting grooves 50, 50, as shown by an arrow E in FIG. 7, between a position in which the cover member overlies the spring contact section 45 as shown in FIG. 3 and a position in which the cover member is moved towards one end of the battery casing 15 to lay open the spring connection terminal 45. The cover member 46 is biased by a tension coil spring 47 in a direction shown by an arrow F in FIG. 7, that is in a direction in which the cover member ultimately overlies the spring connection terminal 52. The tension coil spring 47 has its one end retained by a retainer 49 formed on the side of the cover member 46 facing the bottom of the contact groove 43, while having its other end retained by a retainer 48 formed on the bottom of the contact groove 43.

When the battery casing 15 is attached to the outer casing 1, with the spring contact section 45 laid open as a result of sliding of the cover member 46, the stationary contact 24 and the spring contact section 45 are brought into abutting contact with each other. Thus the electronic circuits or units provided in the outer casing 1 are driven into operation by being supplied with the driving electric power from the battery 16 in the battery casing 15 through the power supply terminal and the power receiving terminal.

For attaching the above mentioned battery casing 15 to the outer casing 1, the engaging projection 17 is fitted into the engaging groove 19 by sliding from the lateral side as shown by an arrow A in FIG. 3. First, as shown in FIG. 7 the upper end of the battery casing 15 is brought into abutment with the lower end of the outer casing 1. At this time, the battery casing 15 is deviated slightly towards one lateral side with respect to the outer casing 1 so that the engaging lugs 18 are not in abutment with the mating engaging lugs 20. The engaging projection 17 is engaged at this time in the engaging groove 19. The distal end of the locking pin 37 is placed at this time into the contact groove 43.

The battery casing 15 is then slid towards the right-hand side of the outer casing 1, as shown by an arrow G in FIG. 8. As shown in FIG. 9, the engaging lugs 18 start to be engaged with the mating engaging lugs 20. The cover member 46 abuts on the lateral side of the stationary contact 24, so that, as the battery casing 15 is further moved relative to the outer casing 1, the cover member is halted at a position of abutment with the lateral surface of the stationary contact 24 against the force of the tension coil spring 47. The locking pin 37 has its distal end pressed by the bottom surface of the engaging groove 19 of the outer casing 1, so that, as shown by an arrow N in FIG. 9, the locking pin 37 is moved towards the inside of the battery casing 15, with the distal end of the locking pin being receded into the locking pin protruding opening 38.

When the battery casing 15 is further slid until the one end or right-hand end of the battery casing 15 is overlapped with the other or right-hand end of the outer casing 1, as shown in FIG. 10, the stationary contact 24 and the spring contact 45 are at such a relative position that the connection terminal 31 and the spring connection terminal 45 contact each other. At this time, the cover member 46 abuts on the lateral side of the stationary contact 24 to lay open the spring contact 45 towards the stationary contact 24 against the force of the tension coil spring 47. The locking pin 37 has its distal end protruded by way of the locking pin protruding opening 38, under the force of the spring 39, for engaging the distal end into the engaging opening 36 in the outer casing 1.

With the distal end of the locking pin 37 engaging in the engaging opening 36, the sliding movement of the battery casing 15 with respect to the outer casing 1 is inhibited.

At this time, the engaging lugs 18 are engaged with the mating engaging lugs 20.

The locking pin 37 may be moved in a direction shown by an arrow I in FIG. 10, that is, towards the interior of the battery casing 15, against the bias of the biasing spring 39, while the engaging projection 17 and the engaging groove 19 are slid relative to each other as shown by an arrow J in FIG. 10, for detaching the battery casing 15 from the outer casing 1. That is, the battery casing 15 may be detached from the outer casing 1 by shifting the battery casing 15 to a position slightly offset towards one side of the outer casing 1 so that the lugs 18 and 20 are not engaged with each other, as shown in FIG. 8.

With the above described radio telephone apparatus, when the outer casing 1 is separated from the battery casing 15, the spring contact 45 is protected by the cover member 46. On the other hand, when the outer casing 1 and the battery casing 15 are united to each other, the cover member 46 is moved relative to the battery casing 15 to permit the spring contact 45 to be connected to the stationary contact 24. Meanwhile, a charging terminal 160 for charging the charging type battery 16 is provided in the battery casing 15.

The microphone unit 23 for converting voice into transmission electrical signals is enclosed in the battery casing 15. The microphone unit 23 is adapted for detecting voice from outside by way of one or more sound collecting openings 23a provided on the front surface of the battery casing 15. The transmitted signals from the microphone unit 23 are supplied to the transceiver circuit section of the main body section, formed by the outer casing 1, by means of the spring connection terminal 45 and the connection terminal 31. It is noted that the microphone unit 23 is mounted within the battery casing 15 by being fitted between supporting bosses 58.

A ringer device 25 is enclosed within the battery casing 15. This ringer device 25 is adapted for producing a notice to the effect that the transceiver circuit has received the electrical waves sent from the telephone exchange station and for generating an acoustic sound for affirming the operation on the transceiver circuit section via the input device 9. This acoustic sound may, for example, be a predetermined acoustic sound having a unitary frequency and interrupted at a predetermined time interval of the order of several seconds. Similarly to the microphone unit 23, the ringer device 25 is attached by supporting means, such as supporting bosses, provided within the battery casing 15.

It is noted that, while the ringer device 25 is mounted within the battery casing 15 in juxtaposition with the microphone unit 23, as shown in FIG. 11, the ringer device 25 is attached to the back wall of the casing 15 opposite to the front wall thereof to which the microphone unit 23 is attached, in order to render the collection of sound radiated from the ringer device by the microphone unit 25 difficult. That is, the microphone unit 23 and the ringer device 25 are mounted within the battery casing 15 with the sound collecting surface of the microphone unit 23 and the sound radiating surface of the ringer device 25 facing in the opposite directions. Similarly to the microphone unit 23, the ringer device is mounted in position by being fitted between upright supporting bosses 158 mounted within the battery casing 15. The surface of the casing 15 facing the sound radiating side of the ringer device 25 is formed with a sound radiating opening 15a.

It is noted that, when the battery casing 15 accommodating the battery, the microphone unit 23 and the ringer device 25, is united with the outer casing 1 accommodating the speaker unit 7, as shown in FIG. 2 the radio telephone apparatus has an overall length $L_1$ of 16 cm. On the other hand, when the outer casing 1 is united with the battery casing 15, the distance $L_2$ between the speaker unit 7 provided in the outer casing 1 and the microphone unit 23 provided in the battery casing 15 is 13 cm. These distances are so selected that, when the speaker unit 7 is applied to the user's ear, the microphone unit 23 faces the user's mouth to enable the voice of the person speaking with the user over the telephone to be heard satisfactorily.

With the above described wireless telephone device of the present invention, a so-called hook-up operation may be performed by using the input device 9 to read out the so-called compacted dial or to specify the destination by ten-key operation to send the electrical waves calling out the telephone of the called party to the telephone exchange station. When the hook-up is made at the telephone apparatus of the called party, the present radio telephone apparatus is in the talking state.

When the electrical waves transmitted from the telephone exchange station to the present radio telephone apparatus as the destination are received by the radio telephone apparatus, the ringer device 25 of the radio telephone apparatus is actuated to give notice to the effect that the electrical waves have been received. When the hook-up operation is made at this time with the use of the input device 9, the present radio telephone apparatus is in the talking state.

When the radio telephone apparatus is in the talking state, the user's voice is detected and output by the microphone unit 23 as the transmission signals sent out as electrical waves to the telephone exchange station, while the electrical waves sent from the telephone exchange station are received by the transceiver circuit section and the output signal from the transceiver circuit section is converted by the speaker unit 7 into acoustic sounds.

With the present radio telephone apparatus, since the ringer device 25 is enclosed within the battery casing 15, the acoustic sound emitted from the ringer device 25 is blocked by the outer wall of the battery casing 15 facing the outer casing 1 and the outer wall of the outer casing 1 to suppress direct propagation thereof into the inside of the outer casing 1.

Although the battery casing 15 employed in the above described radio telephone apparatus is of a size to hold two batteries 16, it may also be of a size to hold a larger number of, for example, four batteries 16, as shown in FIG. 12, in order to increase the storage capacity to enable the radio telephone apparatus to be used for a longer period of time. In this case, the four batteries 16 are contained in juxtaposition, as shown in FIG. 12, in order to prevent the battery casing 15 from being increased in thickness. With the battery casing 15 thus increased in size, the length of the casing 19 is increased to provide some space allowance below the casing 15 to permit the microphone unit 23 and the ringer device 25 to be arranged in juxtaposition along the length of the casing 15. The ringer device 25 may be spaced apart form the speaker unit 7 to render the sound emitted by the ringer device 25 less liable to reach the microphone unit 25.

With the above described radio telephone apparatus, the microphone unit 23 is mounted in the battery casing 15 detachably mounted on the outer casing 1 forming the main body of the telephone device. Thus a spacing is provided between the microphone unit 23 and the speaker unit 7 in the outer casing.

In order to provide for the variable distance between the speaker unit 9 and the microphone unit 23, a microphone container 61 containing the microphone unit 23 is pivotally supported by the lower end of the battery casing 15 by means of a rotary hinge 62. The microphone container 61 is in the form of a rectangular box having an upper surface with an area equal to that of the lower end surface 15a of the battery casing 15. The microphone container 61 is pivotally mounted by the hinge 62 along one side edge of the casing 15 for opening or closing the lower end surface 15a. Thus the microphone container 61 may be rotated with the hinge 62 as the fulcrum of rotation between a position closing the lower end face 15a of the battery casing 15 as shown in FIG. 12, and a position rotated a predetermined angle relative to the casing 15 to lay open the end surface 15a. It will be noted that the hinge 62 is formed by a pivot shaft 62b passing through a pivot shaft support 62a on the side of the battery casing 15. The microphone container 61 is supported by the shaft 62a along one side edge thereof so as to be supported by the battery casing 15. The hinge 62 is adapted for rotatably supporting the microphone container 61 by the battery casing 15 at an opening angle $\theta$ of the order of 60 degrees.

Figure 13:
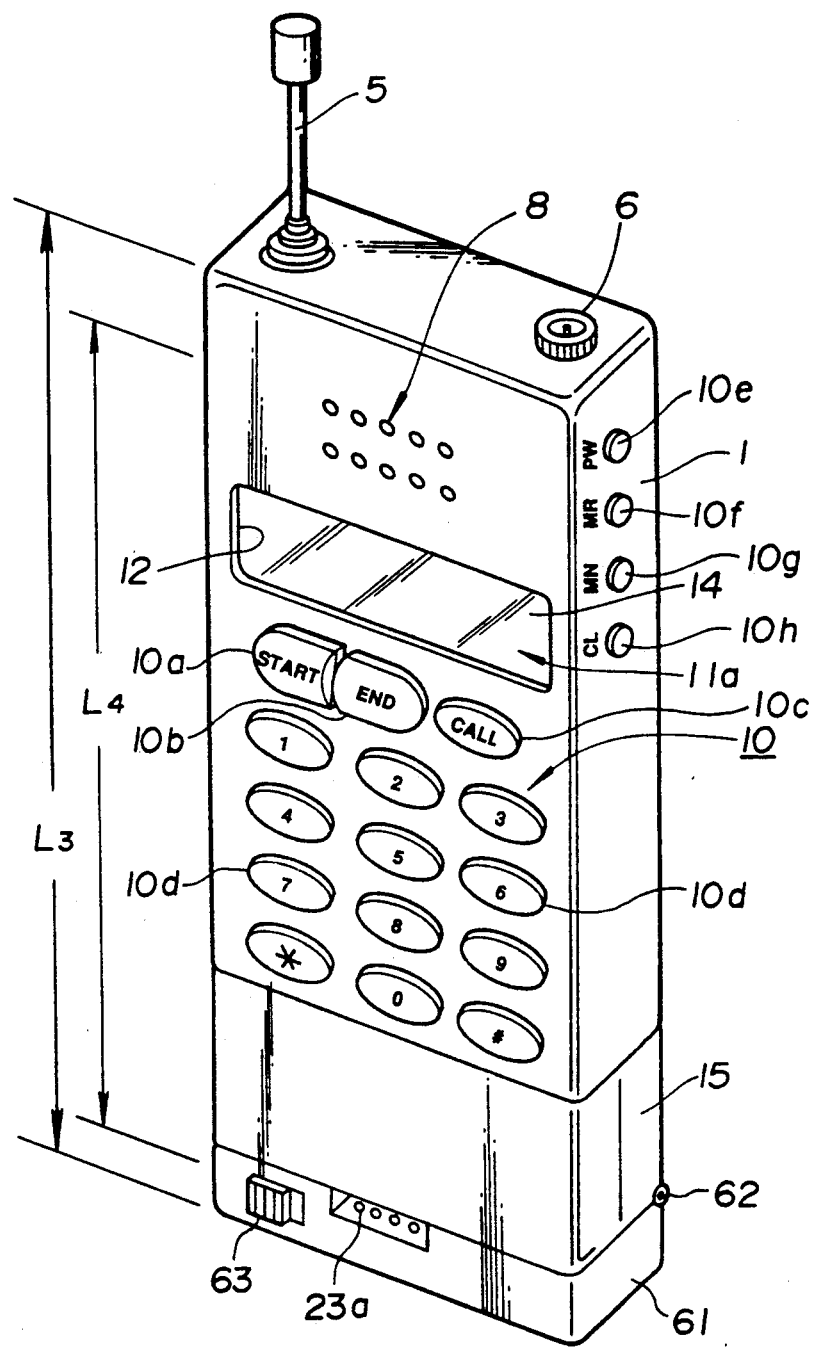
FIG. 13 is a perspective view showing a modification of the radio telephone apparatus in which the microphone container is pivotally mounted on the battery casing.

The microphone container 61 is also provided with a locking lever 63 for maintaining the container in the rotated state of closing the lower end surface 15a of the battery casing 15, as shown in FIG. 13. This locking lever 63 has a locking end pawl 63a engaged with an engaging opening 64 in the lower end surface 15a of the battery casing 15 for holding the microphone container 61 by the battery casing 15. The locking lever 63 may be slid in the direction shown by an arrow X in FIG. 13 for unlocking.

With the microphone container 61 supported in this manner by the battery casing 15 by the intermediary of the rotary hinge 62, the distance between the speaker unit 7 and the microphone unit 23 may be changed between the closure position closing the battery casing 15 as shown in FIG. 12 and the opening position opening the battery casing 15 as shown in FIG. 13. Since the position of the microphone unit 23 is variable, the telephone device may be used in an optimum state by many users, while the overall size $L_3$ of the radio telephone apparatus may be diminished, because the distance between the microphone unit 23 and the speaker unit 7 may be increased by pivoting the microphone container 61 relative to the battery casing 15 during use of the telephone apparatus. With the telephone apparatus of the present embodiment, the distance $L_4$ between the speaker unit 7 and the microphone unit 23 at the closed position of the microphone container 61 is 12 cm.

Figure 14:
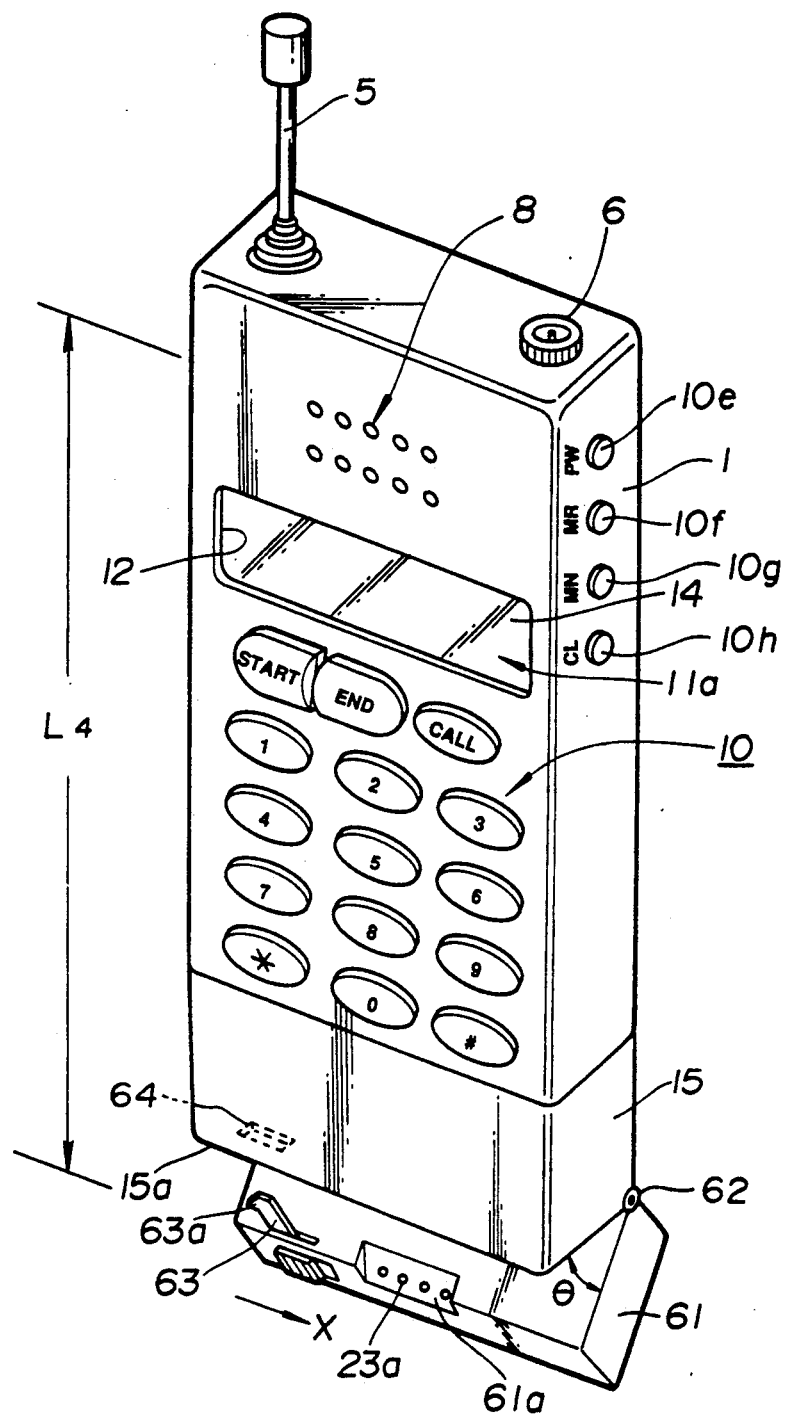
FIG. 14 is a perspective view of a radio telephone apparatus in which the microphone container has been swung open relative to the battery casing.
Figure 15:
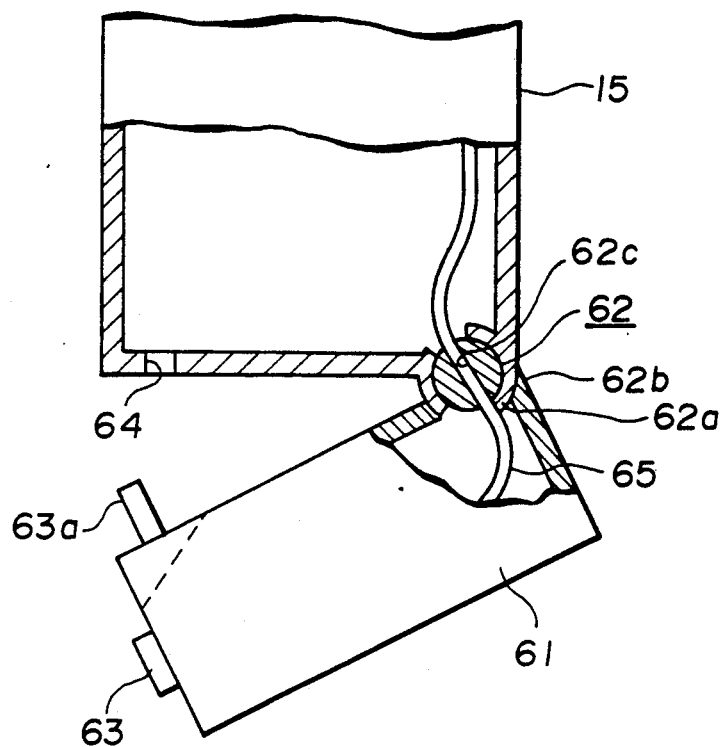
FIG. 15 is a diagrammatic sectional view showing a pivot for supporting the microphone container relative to the battery casing.

It will be noted that, with the present embodiment of the radio telephone apparatus, the microphone unit 23 is mounted at such a position that optimum sound collection may be achieved both at the position of the microphone container 61 closing the battery casing 15 as shown in FIG. 12 and at the position of the microphone container 61 laying open the battery casing 15 as shown in FIG. 14. That is, the microphone unit 27 is mounted at such a position that the sound collecting surface thereof faces the user's mouth during use both at the closure position of the microphone container 61 as shown in FIG. 13 and at the opening position thereof as shown in FIG. 14. More specifically, the microphone unit 23 is mounted with the sound collecting surface thereof facing an inclined surface 61a formed by segmenting the front edge of the microphone container 61 opposite to the hinge 62. This inclined surface 61a is formed with a plurality of sound collecting apertures 23a.

It will be noted that the microphone unit 23 accommodated in the microphone container 61 is connected to a signal ouput terminal in the spring contact 45 within the battery casing 15 by means of a flexible printed circuit board 65 passing through a slit 62c formed in the pivot shaft 62b, as shown in FIG. 14. With the battery casing 15 attached to the outer casing 1 and the spring contact 45 connected to the stationary contact 24, the microphone unit 23 is electrically connected to the transceiver circuit section within the outer casing 1. By using the flexible printed circuit board 65 at the pivot 62b, the printed circuit board 65 may be flexed to follow the partial rotation of the microphone container 61 to maintain the electrical connection of the microphone unit 23 with the transceiver circuit for any pivoted position of the microphone unit 23.

Although various minor changes and modifications might be proposed by those skilled in the art, it will be understood that we wish to include within the claims of the patent warranted hereon all such changes and modifications as reasonably come within our contribution to the art.

What is claimed is:

1. A radio telephone apparatus, comprising:
   a receiver section, a transmitter section, a speaker unit, and a microphone unit;
   a first casing accommodating at least said receiver and transmitter sections and said speaker unit, said speaker unit being positioned adjacent one end of said first casing;
   a second casing accommodating a battery supplying a driving current to said receiver section and said transmitter section, said second casing having a releasable attachment means for attachment of the second casing to said first casing at another end thereof opposite said one end;
   said microphone unit being mounted in said second casing;
   a ringer device being also provided in said second casing
   said microphone unit being mounted on a front wall of said second casing and said ringer device being mounted on a back wall of said second casing; and
   said second casing including a microphone container accommodating said microphone unit, said container being pivotably connected to a portion of said second casing, said microphone container having open and closed positions, said microphone unit being operable in either said open or closed positions, and in said open position said microphone unit being spaced at a greater distance from said speaker unit than in said closed position.

2. A radio telephone apparatus, comprising:
   a receiver section, a transmitter section, a speaker unit, and a microphone unit;
   a first casing accommodating at least said receiver and transmitter sections and said speaker unit, said speaker unit being positioned adjacent one end of said first casing;
   a second casing accommodating a battery supplying a driving current to said receiver section and said transmitter section, said second casing having a releasable attachment means for attachment of the second casing to said first casing at another end thereof opposite said one end;
   said microphone unit being mounted in said second casing; and
   said second casing including a microphone container accommodating said microphone unit, said container being pivotably connected to a portion of said second casing, said microphone container having open and closed positions, said microphone unit being operable in either said open or closed positions, and in said open position said microphone unit being spaced at a greater distance from said speaker unit than in said closed position.

3. A radio telephone apparatus, comprising:
   a receiver section, a transmitter section, a speaker unit, and a microphone unit;
   a first casing accommodating at least said receiver and transmitter sections and said speaker unit, said speaker unit being positioned adjacent one end of said first casing;
   a second casing accommodating a battery supplying a driving current to said receiver section and said transmitter section, said second casing having a releasable attachment means for attachment of the second casing to said first casing at another end thereof opposite said one end;
   said microphone unit being mounted in said second casing; and
   said releasable attachment means comprising means for allowing the second casing to be slid laterally relative to said other end of said first casing for attachment thereto, said releasable attachment means having associated therewith a cover member means for protecting an electrical contact means for connecting said battery to said receiver and transmitter sections, and means being provided on said first casing for pushing said cover means away from said contact means when said second casing is laterally slid into position for connection with said first casing.

4. A radio telephone apparatus, comprising:
   a first casing containing a transmitter section and a receiver section, said first casing having adjacent one end thereof a speaker unit, and at an opposite end thereof a stationary contact protruding therefrom;
   a second casing mateable with said first casing and comprising a battery container having a spring contact at a first end thereof contactable with said stationary contact of said first casing;
   said second casing having means for slidable attachment of said first end of said second casing to said other end of said first casing;
   a contact cover means provided at said first end of said second casing for sliding between a position overlying said spring contact and a position where said spring contact is uncovered for connection to said stationary contact;
   biasing means for resiliently biasing said contact cover means to said overlying position; and
   an abutting member means at said other end of said first casing for abutting against said cover member means for sliding the same to said uncovered position when said second casing is slid into connection with said first casing.

5. An apparatus according to claim 4 wherein the abutting member comprises said stationary contact protruding at said other end of said first casing.

6. An apparatus according to claim 4 wherein a microphone unit is provided in said second casing and exposed through transmission apertures in a front wall of said second casing to the outside.

7. An apparatus according to claim 4 wherein said second casing comprises a microphone container means for accommodating said microphone unit, said container means being pivotable between an opened and closed position wherein said microphone unit is spaced in said open position a greater distance from said speaker unit than in said closed position.

* * * * *